United States Patent [19]
Meijer et al.

[11] Patent Number: 5,932,660
[45] Date of Patent: Aug. 3, 1999

[54] MODIFICATION OF (CO) POLYMERS WITH CYCLIC KETONE PEROXIDES

[75] Inventors: John Meijer, Deventer; Andreas Herman Hogt, Enschede; Gerrit Bekendam, Wierden; Leonie Arina Stigter, Driebergen, all of Netherlands

[73] Assignee: Akzo Nobel nv, Arnhem, Netherlands

[21] Appl. No.: 08/776,177

[22] PCT Filed: Jul. 14, 1995

[86] PCT No.: PCT/EP95/02829

§ 371 Date: Mar. 13, 1997

§ 102(e) Date: Mar. 13, 1997

[87] PCT Pub. No.: WO96/03444

PCT Pub. Date: Feb. 8, 1996

[30] Foreign Application Priority Data

Jul. 21, 1994 [EP] European Pat. Off. ............. 94202135

[51] Int. Cl.⁶ ..................................................... C08F 8/00
[52] U.S. Cl. .................. 525/256; 525/328.2; 525/328.3; 525/328.8; 525/329.1; 525/324.2; 525/329.3; 525/329.4; 525/330.3; 525/330.9; 525/331.5; 525/332.8; 525/332.9; 525/333.1; 525/333.2; 525/333.3; 525/333.8; 525/387
[58] Field of Search ..................................... 525/256, 387

[56] References Cited

U.S. PATENT DOCUMENTS

| | | | |
|---|---|---|---|
| 3,003,000 | 10/1961 | Milas | 260/610 |
| 3,149,126 | 9/1964 | Milas | 260/338 |
| 3,575,918 | 4/1971 | Daniels et al. | 260/40 |
| 4,431,775 | 2/1984 | Maeda et al. | 525/193 |
| 4,451,589 | 5/1984 | Morman et al. | 523/124 |

FOREIGN PATENT DOCUMENTS

| | | | |
|---|---|---|---|
| 999698 | 9/1976 | Canada | 402/600 |
| 0 264 156 | 4/1988 | European Pat. Off. | C08F 8/50 |
| 0 322 945 | 7/1989 | European Pat. Off. | C08F 8/08 |
| 0 453 204 | 10/1991 | European Pat. Off. | C08K 5/14 |
| 0 497 590 | 8/1992 | European Pat. Off. | C08F 110/06 |
| 2 401 375 | 8/1974 | Germany | C08D 13/28 |
| WO 87/06944 | 11/1987 | WIPO | C08F 8/50 |
| WO 94/05707 | 3/1994 | WIPO | C08F 8/50 |

OTHER PUBLICATIONS

*International Search Report*, dated Oct. 9, 1995.
*Uhlmann*, 3rd edition (1962), Peroxyde, organische, pp. 256–257.
*Journal of American Chemical Society*, vol. 81, pp. 5824–5826 (1959).
*Organic Peroxides, Wiley Interscience*, N.Y. (1970). vol. III pp. 67–87.
*Houben–Weyl, Methoden der organ. Chemie*, E13, vol. 1 p. 736, and English translation.
*Rubber Chemistry and Technology*, vol. 61, 1988, pp. 238–255.
*The Industrial Chemist*, Jul., 1956, pp. 272–273.
*Progress in Rubber and Plastics Technology*, vol. 1, No. 1 Jan. 1985, Crosslinking Agents in Ethylene–Propylene Rubbers, pp. 18–50.
*Derwent*, abstract, DE 3642–273–A, Dec. 11, 1986.

*Primary Examiner*—Bernard Lipman
*Attorney, Agent, or Firm*—Ralph J. Mancini

[57] ABSTRACT

A process for the modification of (co) polymers employing an organic peroxide comprising the step of contacting a (co) polymer with organic peroxide under conditions whereby at least some of the said organic peroxide is decomposed, is disclosed. The process is characterized in that at least 20% of the total active oxygen content of said organic peroxide is attributable to one or more cyclic ketone peroxides. In a second aspect, the invention relates to the use of an organic peroxide composition wherein at least 20% of the total active oxygen content is contributed by one or more cyclic ketone peroxide(s) modify (co) polymers. It has been found that these cyclic ketone peroxides are extremely efficient in (co) polymer modification processes.

9 Claims, No Drawings

MODIFICATION OF (CO) POLYMERS WITH CYCLIC KETONE PEROXIDES

FIELD OF THE INVENTION

The present invention relates to a process for the modification of (co)polymers which employs cyclic ketone peroxides and to the use of these cyclic ketone peroxides for the modification of (co)polymers.

BACKGROUND OF THE INVENTION

Several processes for the modification of (co)polymers with peroxides are known from the prior art. In many of these processes, unsaturated peroxides are employed. Some examples of these processes can be found in EP-A-0322945 and WO 94/05707.

In addition, Canadian Patent 999,698 teaches that methylethyl ketone peroxides can be used to reduce the viscosity of a-olefinic polymers. Further, EP-A-0-497590 and EP-A-0264156 are examples of patents which suggest the use of methylethyl ketone peroxide and methylisobutyl ketone peroxide for increasing the melt flow index of polypropylene.

Methylethyl ketone peroxide and methylisobutyl ketone peroxide are known to be mixtures of several different ketone peroxide compounds, among which the noncyclic ketone peroxides predominate. However, these ketone peroxides do contain some small quantities of cyclic ketone peroxides which result from side reactions during the preparation of the methylethyl and methylisobutyl ketone peroxides. For example, in commercially available methylethyl ketone peroxides about 1–4% of the total active oxygen content is attributable to cyclic ketone peroxides.

Although these peroxides are known for use in the modification of polymers, their performance in, for example, polypropylene degradation is disappointing and they often cause yellowing of the polymer. Thus, while these peroxides increase the melt flow index of polypropylene, they are not nearly as effective as commercial products such as 2,5-bis (tertiarybutylperoxy)-2,5-dimethyl hexane in this application. The present peroxides offer a performance which is comparable to that of the commercially available peroxides and offer the further advantage that less undesirable by-products are generated by side reactions of the peroxides during their decomposition.

Accordingly, there remains a need in the art for peroxides which provide an acceptable price/performance ratio in polymer modification. These and other objects of the present invention will be apparent from the summary and detailed description of the present invention which follow.

SUMMARY OF THE INVENTION

In a first aspect, the present invention relates to a process for the modification of (co)polymers employing an organic peroxide. The process comprises the step of contacting a (co)polymer with organic peroxide under conditions whereby at least some of said organic peroxide is decomposed. The process is further characterized in that at least 20% of the total active oxygen content of the organic peroxide is attributable to at least one cyclic ketone peroxide selected from peroxides represented by the formulae I–III:

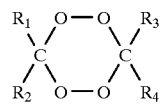

(I)

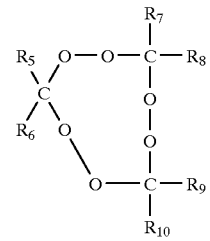

(II)

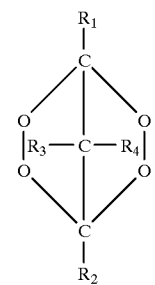

(III)

wherein $R_1$–$R_{10}$ are independently selected from the group consisting of hydrogen, $C_1$–$C_{20}$ alkyl, $C_3$–$C_{20}$ cycloalkyl, $C_6$–$C_{20}$ aryl, $C_7$–$C_{20}$ aralkyl and $C_7$–$C_{20}$ alkaryl, which groups may include linear or branched alkyl moieties; and each of $R_1$–$R_{10}$ may be optionally substituted with one or more groups selected from hydroxy, $C_1$–$C_{20}$ alkoxy, linear or branched $C_1$–$C_{20}$ alkyl, $C_6$–$C_{20}$ aryloxy, halogen, ester, carboxy, nitrile, and amido.

In a second aspect, the present invention also relates to the use of an organic peroxide wherein at least 20% of the total active oxygen content is attributable to at least one cyclic ketone peroxide selected from peroxides represented by the formulae I–III; to modify (co)polymers.

International Patent Application No. WO 87/06944 discloses the use of 3,6,6,9,9-pentamethyl-3-n-propyl-1,2,4,5-tetraoxy cyclononane to modify polypropylene and increase its melt flow index. A similar disclosure is found in U.S. Pat. No. 4,451,589. However, these publications do not teach or suggest the use of the present organic peroxides of the formulae I–III for the modification of (co)polymers.

It has been unexpectedly found that the peroxides of the formulae I–III provide a performance in polymer modification processes which is comparable to the performance of commercially available peroxides for this application and that they provide a performance which is superior to their non-cyclic dialkyl ketone peroxide counterparts.

DETAILED DESCRIPTION OF THE INVENTION

The peroxides of the formulae I–III can be made by reacting a ketone with hydrogen peroxide as is described in U.S. Pat. No. 3,003,000; Uhlmann, 3rd Edition, Vol. 13, pp. 256–57 (1962); the article, "Studies in Organic Peroxides. XXV. Preparation, Separation and Identification of Peroxides Derived from Methyl Ethyl Ketone and Hydrogen Peroxide," Milas, N. A. and Golubovic, A., J. Am. Chem.

Soc., Vol. 81, pp. 5824–26 (1959), *Organic Peroxides*, Swern, D. editor, Wiley-Interscience, New York (1970) and Houben-Weyl Methoden der Organische Chemie, E13, Volume 1, page 736, the disclosures of which are hereby incorporated by reference.

Suitable ketones for use in the synthesis of the present peroxides include, for example, acetone, acetophenone, methyl-n-amyl ketone, ethylbutyl ketone, ethylpropyl ketone, methylisoamyl ketone, methylheptyl ketone, methylhexyl ketone, ethylamyl ketone, diethyl ketone, dipropyl ketone, methylethyl ketone, methylisobutyl ketone, methylisopropyl ketone, methylpropyl ketone, methyl-n-butyl ketone, methyl-t-butyl ketone, isobutylheptyl ketone, diisobutyl ketone, 2,4-pentanedione, 2,4-hexanedione, 2,4-heptanedione, 3,5-heptanedione, 3,5-octanedione, 5-methyl-2,4-hexanedione, 2,6-dimethyl-3,5-heptanedione, 2,4-octanedione, 5,5-dimethyl-2,4-hexanedione, 6-methyl-2,4-heptanedione, 1-phenyl-1,3-butanedione, 1-phenyl-1,3-pentanedione, 1,3-diphenyl-1,3-propanedione, 1-phenyl-2,4-pentanedione, methylbenzyl ketone, phenylmethyl ketone, phenylethyl ketone, methylchloromethyl ketone, methylbromomethyl ketone and coupling products thereof. Preferred peroxides of the formulae I–III are those in which $R_1$–$R_{10}$ are independently selected from $C_1$–$C_{12}$ alkyl groups. Of course, other ketones having the appropriate R groups corresponding to the peroxides of the formulae I–III can be employed, as well as mixtures of two or more different ketones.

Examples of preferred peroxides of the formulae I–III for use in accordance with the present invention are the cyclic ketone peroxides derived from acetone, methylamyl ketone, methylheptyl ketone, methylhexyl ketone, methylpropyl ketone, methylbutyl ketone, diethyl ketone, methylethyl ketone, mehtyloctyl ketone, methylnonyl ketone, methyldecyl ketone, methylundecyl ketone, and mixtures thereof.

Cyclic ketone peroxides are composed of at least two ketone peroxide entities which may be the same or different. Thus, cyclic ketone peroxides may exist in the form of dimers, trimers, etc. When cyclic ketone peroxides are prepared, usually a mixture is formed which predominantly exists of the dimeric and trimeric forms. The ratio between the various forms mainly depends on the reaction conditions during the preparation. If, desired, the mixture may be separated in the individual cyclic ketone peroxide compounds. Generally, the cyclic ketone peroxide trimers are less volatile and more reactive than the corresponding dimers. Preference for certain compositions or individual compounds may depend on differences in physical properties or requirements in application of the peroxides, e.g. storage stability, half-life time vs. temperature, volatility, boiling point, solubility, etc. It is to be understood that any form of the cyclic ketone peroxides, e.g. oligomeric compounds or mixtures, are comprised in the present invention.

The peroxides can be prepared, transported, stored and applied as such or in the form of powders, granules, pellets, pastilles, flakes, slabs, pastes and solutions. These formulations may optionally be phlegmatized, as necessary, depending on the particular peroxide and its concentration in the formulation.

Which of these forms is to be preferred partly depends on the ease of feeding the peroxide into closed systems. Also, considerations of safety may play a role to the extent that phlegmatizers may have to be incorporated in certain compositions to ensure their safety. As examples of suitable phlegmatizers may be mentioned solid carrier materials such as polymers, silica, chalk, clay, inert plasticizers, solvents and inert diluents such as silicone oils, white oils and water.

The present cyclic ketone peroxides are exceptionally well suited for use in the modification of polymers. More particularly, these peroxides can be employed in processes such as the degradation of polyolefins such as polypropylene and copolymers thereof, the crosslinking of polyolefins such as ethylene/propylene/diene polymers, polyethylene and copolymers thereof, the dynamic crosslinking of blends of elastomers and thermoplastic polymers, the grafting of monomers onto polymers such as polyethers, polyolefins and elastomers, and the functionalization of polyolefins in the case of functional group containing cyclic ketone peroxides.

In general, the cyclic ketone peroxide may be brought into contact with the (co)polymer in various ways, depending upon the particular object of the modification process. For example, if surface modification of a three dimensional polymeric object is desired, the cyclic ketone peroxide may be applied to the surface of the material to be modified. Alternatively, if it is desirable to modify the (co)polymer homogeneously throughout the (co)polymeric matrix, then the peroxide may be mixed with the material to be modified, which material may be in the molten state, in the form of a solution, or, in the case of an elastomer, in a plastic state. It is also possible to mix the (co)polymer, in powder form, with the cyclic ketone peroxide.

To accomplish homogeneous mixing of the unmodified (co)polymer with the peroxide, most conventional mixing apparatus may be used. Typical mixing apparatus includes kneaders, internal mixers and (mixing) extruding equipment. Should mixing be a problem for a particular material because of its high melting point, for example, the (co)polymer can first be modified on its surface while in the solid state and subsequently melted and mixed. Alternatively, the (co)polymer may be first dissolved in a solvent and the reaction with the cyclic ketone peroxide can then be carried out in solution.

An important practical aspect of the present invention is that the moment the cyclic ketone peroxide and the (co)polymer are brought into contact with each other and also the moment that the cyclic ketone peroxide is to react with the (co)polymer can be chosen independently of the other usual polymer processing steps, including the introduction of additives, shaping, etc. For instance, the modification may be done before other additives are introduced into the polymer or after the introduction of other additives. More importantly, it is possible to accomplish the present polymer modification during a polymer shaping step such as extrusion, compression moulding, blow moulding or injection moulding. The present polymer modification process is most preferably carried out in an extrusion apparatus.

The word, "(co)polymer" as used in this application should be interpreted to mean, "polymers and copolymers." The term, "ketone peroxide" as used in this application should be interpreted to include peroxides derived from both ketones and aldehydes.

In general, any (co)polymer comprising abstractable hydrogen atoms can be modified by the present process. The (co)polymer material treated by the process of the present invention may be in any physical form including finely divided particles (flake), pellets, film, sheet, in the melt, in solution and the like. In the preferred embodiments of the present invention the (co)polymeric material is in the finely divided form suitable for powder modification in a substantially oxygen-free atmosphere, in the melt form suitable for modification in an air-containing atmosphere or a nitrogen atmosphere, or in a solution in a suitable solvent.

The amount of peroxide used in the modification process of the present invention should be an amount effective to achieve significant modification of the (co)polymer when treating a (co)polymer. More particularly, from 0.001–15.0 weight percent of peroxide, based on the weight of the (co)polymer, should be employed. More preferably, from 0.005–10.0 weight percent is employed. Most preferably, an amount of 0.01–5.0 weight percent is employed.

In order to clearly distinguish the present cyclic ketone peroxides from prior art ketone peroxides which contained some cyclic ketone peroxides as an impurity therein, it is required that at least 20 percent of the total active oxygen content of the peroxide(s) employed in the modification process of the present invention be attributable to one or more cyclic ketone peroxide(s). More preferably, the cyclic ketone peroxides provide at least 50 percent of the total active oxygen content of the composition which is employed in the modification process and most preferably at least 70 percent of the total active oxygen content of the peroxide composition used in the modification process is attributable to the cyclic ketone peroxide(s). Comparative examples included herein demonstrate the advantages of these cyclic ketone peroxides over their non-cyclic counterparts.

During modification, the (co)polymer may also contain the usual polymer additives. As examples of such additives may be mentioned: stabilizers such as inhibitors of oxidative, thermal or ultraviolet degradation, lubricants, extender oils, pH controlling substances such as calcium carbonate, release agents, colorants, reinforcing or non-reinforcing fillers such as silica, clay, chalk, carbon black and fibrous materials such as glass fibers, nucleating agents, plasticizers, accelerators, and cross-linking agents such as other types of peroxides and sulfur. These additives may be employed in the usual amounts.

It has been found that when certain (co)polymers are contacted with the present cyclic ketone peroxides, degradation of the polymer chains occurs. For instance, polymers which tend to degrade include isotactic polypropylene, atactic polypropylene, syndiotactic polypropylene, alkylene/propylene copolymers such as ethylene/propylene random and block copolymers, and terpolymers such as alkylene/propylene/butylene terpolymers, e.g., ethylene/propylene/butylene terpolymers; propylene/diene monomer copolymers, propylene/styrene copolymers, poly(butene-1), poly(butene-2), polyisobutene, isoprene/isobutylene copolymers, chlorinated isoprene/isobutylene copolymers, poly(methylpentene), polyvinyl alcohol, polystyrene, poly(a-methyl)styrene, 2,6-dimethyl polyphenylene oxide and mixtures or blends of these polymers with one another and/or with other non-degradable polymers.

The treatment of (co)polymers prone to degradation by the process of the present invention generally produces a polymeric material having a net increase in melt flow index and decrease in weight average molecular weight, as well as a narrower molecular weight distribution (dispersity), when compared to the starting, unmodified polymer. In the case of polypropylene and copolymers thereof, most of the mechanical properties of the modified (co)polymers remain unchanged. Further, some properties of specific (co) polymeric products are improved, such as, tenacity of fibers, warpage of injection-molded articles and the transparency of polymer films. The modification process of the present invention is particularly advantageous for various polypropylene processes such as fiber spinning, high speed injection molding and melt-blowing of non-wovens.

Degradation may be carried out in the usual manner. In the presence of one or more of the peroxides of the formulae I–III, the (co)polymer is heated to a temperature above the melting point of the (co)polymer and above the decomposition temperature of the peroxide. Usually, a temperature of 50–350° C., more preferably, 100–300° C., is employed. The heating time is generally between 0.1 and 30 minutes and, more preferably, 0.5–5 minutes. Degradation is most preferably carried out in an extrusion apparatus.

Peroxides containing t-butylperoxide groups, commonly employed in the degradation of polyolefins, release upon reaction t-butanol and acetone as major decomposition products. An advantage of cyclic ketone peroxides such as those derived from methylethyl ketone, methylpropyl ketone, butylmethyl ketone and diethyl ketone, is that they do not give acetone or t-butanol as decomposition products.

The present cyclic ketone peroxides may also be employed in the cross-linking of polymers such as low, linear low, medium and high density polyethylene, ethylene/alkene copolymers, ethylene/propylene/diene monomer terpolymers, chlorosulphonated polyethylene, chlorinated polyethylene, ethylene/vinyl acetate copolymers, ethylene/propylene copolymers, propylene/diene monomer copolymers, brominated isoprene/isobutylene copolymers, partially hydrogenated butadiene/acrylonitrile copolymers, polyisoprene, polychloroprene, poly(cyclopentadiene), poly (methylcyclopentadiene), polynorbornene, isoprene/styrene copolymers, butadiene/styrene copolymers, butadiene/acrylonitrile copolymers, acrylonitrile/butadiene/styrene terpolymers, polyacrylamides, polymethacrylamides, polyurethanes, polysulfides, polyethylene terephthalate, polybutylene terephthalate, copolyether esters, polyamides, silicone rubbers, fluorrubbers such as polyfluoralkoxyphosphazenes; allylglycidylether/epichlorohydrin copolymers and mixtures or blends thereof.

For carrying out the cross-linking process of the present invention, use may be made of conventional cross-linking techniques and equipment. The process of the present invention is particularly suitable for the crosslinking of high density polyethylene in rotomolding processes which are generally carried out at high temperatures.

The present invention is also suitable for the dynamic cross-linking of a blend of an elastomer and a thermoplastic (co)polymer. Suitable elastomers for use in the blends to be dynamically crosslinked by the process of the present invention comprise ethylene/vinyl acetate copolymers, chlorinated polyethylenes, chlorosulphonated polyethylenes, ethylene/propylene copolymers, ethylene/propylene/diene monomer terpolymers, butadiene/acrylonitrile copolymers, hydrogenated butadiene/acrylonitrile copolymers, natural rubber, polychloroprene, silicone rubbers, fluorrubbers and mixtures or blends thereof.

Suitable thermoplastic (co)polymers for use in the blends crosslinked by the process of the present invention comprise thermoplastic, crystalline or amorphous (co)polymers. More particularly, said (co)polymer is selected from low, medium and high density polyethylene, isotactic polypropylene, atactic polypropylene, syndiotactic polypropylene, polyethylene terephthalate, polybutylene terephthalate, polyamides, polyphenylene oxides, alloys of polyphenylene oxides with polystyrene and mixtures thereof.

The (co)polymer modification process of the present invention is also useful for the grafting of monomers onto polymers or for the production of graft-copolymers. Examples of suitable (co)polymers which according to the present invention can be grafted by means of the cyclic ketone peroxides are copolymers and block copolymers of conjugated 1,3-dienes, and one or more copolymerizable monoethylenically unsaturated monomers such as aromatic monovinylidene hydrocarbons, halogenated aromatic monovinylidene hydrocarbons, (meth)acrylonitrile, alkyl (meth)acrylates, acrylamides, unsaturated ketones, vinyl esters, vinylidenes and vinyl halides; ethylene/propylene copolymers and ethylene/propylene copolymers with other (poly)unsaturated compounds such as hexadiene-1,4, dicyclopentadiene and 5-ethylidenenorbornene; polyolefins such as polyethylene, polypropylene and copolymers thereof; and polyols including polyols which are essentially free of ethylenic unsaturation. Such polyols include polyalkylene polyether polyols having from 2–6 carbon atoms per monomeric unit and an Mn of 400–2000, polyhydroxyl containing polyesters, hydroxy-terminated polyesters and aliphatic polyols.

Suitable monomers for grafting onto the above-mentioned polymers using the cyclic ketone peroxides of the present invention are olefinic or ethylenically unsaturated monomers such as: substituted or unsubstituted vinyl aromatic monomers including styrene and α-methylstyrene; ethylenically unsaturated carboxylic acids and derivatives thereof such as (meth)acrylic acids, (meth)acrylic esters and glycidyl methacrylate; ethylenically unsaturated nitriles and amides such as acrylonitrile, methacrylonitrile and acrylamide; substituted or unsubstituted ethylenically unsaturated monomers such as butadiene; vinyl esters such as vinyl acetate and vinyl propionate; ethylenically unsaturated dicarboxylic acids and their derivatives including mono- and diesters, anhydrides and imides, such as maleic anhydride, citraconic anhydride, citraconic acid, itaconic acid, nadic anhydride, maleic acid, aryl, alkyl and aralkyl citraconimides and maleimides; vinyl halogenides such as vinyl chloride and vinylidene chloride; olefins such as isobutene and 4-methylpentene; and epoxides.

In the grafting process, the ratio of the polymer to the grafting monomer is from 99:1 to 1:50. Again, the conventional grafting processes, conditions and apparatus may be employed to achieve grafting with the peroxides of the formulae I–III of the present invention.

Finally, the modification process of the present invention can be employed to introduce functional groups into (co) polymers. This may be accomplished by employing a peroxide of the formulae I–III which contains one or more functional "R" groups attached thereto. These functional groups will remain intact in the free radicals formed by the cyclic ketone peroxides and thus are introduced into the modified (co)polymer. Conventional polymer modification conditions and apparatus may be used to achieve this object of the present invention.

According to a preferred embodiment of the present invention, the modification process is conducted in the presence of a coagent in order to control the amount of polymer degradation or enhance the degree of modification (i.e. crosslinking or functional group introduction) in the (co)polymer.

A coagent is generally understood to be a polyfunctional reactive additive such as a polyunsaturated compound which will react rapidly with polymer radicals, will overcome steric hindrance effects and will minimize undesirable side reactions. Further information about coagents (which are sometimes called coactivators) is set forth in *Rubber Chemistry and Technology*, Vol. 61, pp. 238–254 and W. Hofmann, *Progress in Rubber and Plastics Technology*, Vol. 1, No. 2, March 1985, pp. 18–50, the disclosures of which are hereby incorporated by reference. In relation to the present invention the term "coagent" has the same meaning as is given in these publications.

A wide variety of useful coagents are commercially available including di- and triallyl compounds, di-and tri (meth)acrylate compounds, bismaleimide compounds, divinyl compounds such as divinyl benzene, vinyl toluene, vinyl pyridine, polyalkenylbenzenes and their polymers, polybutadiene, parachinone dioxime, 1,2-cis-polybutadiene and derivatives of these compounds. Furthermore, other useful coagents include oligomers of 1,3-diisopropenyl benzene, 1,4-diisopropenyl benzene, and 1,3,5-triisopropenyl benzene.

The incorporation of an effective amount of one or more of these coagents into the (co)polymer prior to, or during the reaction with the present cyclic ketone peroxides will tend to reduce the amount degradation of the modified materials. In this manner, the degree of degradation can be adjusted, if desired. Suprisingly, in some cases the coagent may result in improved mechanical properties such as an enhanced adhesion strength in modified (co)polymers of a polar nature. This enhancement may be attributable to a greater degree of functional group introduction into the (co)polymer resulting from the presence of a coagent.

Finally, in another aspect, the present invention relates to the use of an organic peroxide wherein 20% of the total active oxygen content is attributable to at least one cyclic ketone peroxide selected from peroxides represented by the formulae I–III; to modify (co)polymers. The modification conditions and apparatus are the same as those disclosed above with respect to the (co)polymer modification processes.

The invention will now be illustrated by the following examples.

EXAMPLES

Materials Employed

Polymers

Ethylene/propylene/diene monomer terpolymer (Keltan® 520, ex DSM).

Polypropylene Homopolymer (Moplen® FLS20, ex. Himont).

Polypropylene Homopolymer (Hostalen® PPH1050, ex. Hoechst).

Polypropylene Homopolymer (Hostalen® PPR1060P, ex. Hoechst).

Polypropylene Copolymer (Stamylan® 56MN10, ex. DSM).

Polypropylene Elastomer blend (Hostalen® PPN8009, ex. Hoechst).

Linear Low Density Polyethylene (LLDPE) (Escorene LL1001XV, ex. Exxon).

Polybutadiene Rubber (Cariflex® BR1202B, ex. Shell)

Carbon Black: Carbon black N-772

Extender oil: Paraffinic oil Sunpar® 150 (ex. Sunoco)

Peroxides 2,5-bis(tert-butylperoxy)-2,5-dimethylhexane-assay 95.35% (Trigonox® 101, ex. Akzo Chemicals) [Theoretical Active Oxygen Content 11.0%].

Methylethyl Ketone Peroxide (Butanox® LPT, ex. Akzo Chemicals)[Total Active Oxygen Content 8.5%].

Methylethyl Ketone Peroxide (MEKP-T3).

Cyclic Methylethyl Ketone Peroxide (MEKP-cyclic) [Total Active Oxygen Content 10.63%].

Methylisopropyl Ketone peroxide (MIPKP-T3) [Total active oxygen content 8.24%].

Methylisobutyl Ketone Peroxide (Trigonox® 233, ex. Akzo Chemicals) [Total Active Oxygen Content 8.04%].

Cyclic Methylisobutyl ketone Peroxide (MIBKP-cyclic) [Total Active Oxygen Content 8.03%].

Cyclic Methylisopropyl Ketone Peroxide (MIPKP-cyclic) [Total Active Oxygen Content 7.86%].

Bis(Tert-butylperoxyisopropyl)benzene (Perkadox® 14-40MB-GR, ex. Akzo Nobel Chemicals) [Theoretical Active Oxygen Content 9.46%].

2,5-Bis(tert-butylperoxy)-2,5-dimethyl-3-hexyne (Trigonox® 145-45B-PD, ex. Akzo Chemicals) [Theoretical Active Oxygen Content 11.17%].

Cyclic Methylethyl Ketone Peroxide (MEKP-cyclic) [Total Active Oxygen Content 10.6%][1])

Cyclic Methylethyl Ketone Peroxide (MEKP-cyclic) [Total Active Oxygen Content* 6.7%][2])

Cyclic Methylethyl Ketone Peroxide Dimer (MEKP-cyclic-D) [Total Active Oxygen Content 6.58%][2])

Cyclic Methylethyl Ketone Peroxide Trimer (MEKP-cyclic-T) [Total Active Oxygen Content 2.0%][1])

Cyclic Methylethyl Ketone Peroxide Trimer (MEKP-cyclic-T) [Total Active Oxygen Content 7.06%][2])

Cyclic Diethyl Ketone Peroxide (DEKP-cyclic) [Total Active Oxygen Content 2.09%][1])

Diethyl Ketone Peroxide (DEKP-T3+T4) [Total Active Oxygen Content 9.0%][1])

Diethyl Ketone Peroxide (DEKP-T3) [Total Active Oxygen Content 9.0%][1])

Cyclic Methylpropyl Ketone Peroxide (MPKP-cyclic) [Total Active Oxygen Content 2.15%][1])

Cyclic Methylpropyl Ketone Peroxide Dimer (MPKP-cyclic-D) [Total Active Oxygen Content 6.18%][2])

Cyclic Methylpropyl Ketone Peroxide Trimer (MPKP-cyclic-T) [Total Active Oxygen Content 7.12%][2])

Methylpropyl Ketone Peroxide (MPKP-T3+T4) [Total Active Oxygen Content 9.0%][1])

Methylpropyl Ketone Peroxide (MPKP-T3) [Total Active Oxygen Content 9.0%][1])

Cyclic Methylbutyl Ketone Peroxide (BMKP-cyclic) [Total Active Oxygen Content 2.4%][1])

Methylbutyl Ketone Peroxide (MBKP-T3+T4) [Total Active Oxygen Content 9.0%][1])

Methylbutyl Ketone Peroxide (MBKP-T3) [Total Active Oxygen Content 9.0%][1])

Cyclic Methylisopropyl Ketone Peroxide Dimer/Trimer (MIPKP-cyclic D/T) [Total active oxygen content 15.7%]

[1] Isododecane
[2] Primol® 352
* diluted

Miscellaneous

Irganox® 1010 (hindered phenol antioxidant—ex. Ciba-Geigy)

Irganox® B225 (Irganox® 1010/Irgafos® 168 1:1, ex Ciba-Geigy)

Tinuvin® 770 (Hindered Amine Light Stabilizer, ex Ciba-Geigy)

Isododecane solvent

Pentadecane solvent

Primol® 352 white oil (ex. Exxon)

Solvesso® 100 (ex. Exxon)

Calcium stearate

Styrene monomer (distilled)

Coagent:

Triallyl Cyanurate (Perkalink® 300, ex. Akzo Nobel Chemicals)

Methods Used in the Examples

The rheological behaviour of the rubber compositions was measured on a Monsanto rheometer MDR 2000E, moving die (20 minutes/range 20 N.m, arc=0.5°) or with a Göttfert® Elastograph. The Theological behaviour gives an indication of the scorch time, the vulcanization time and the crosslink density in the rubber (International Standard ISO 6502).

The Melt Flow Index (MFI) was measured with a Göttfert® Melt Indexer Model MP-D according to DIN 53735/ASTM 1238 (230° C., 21.6 N load).

The melt strength was measured with a Göttfert® Rheotens attached to a Gottfert® Rheograph 2002 capillary rheometer (180° C.).

The total active oxygen content was measured by placing 50 ml of glacial acetic acid in a 250 ml round-bottomed flask fitted with a ground glass joint, an inlet tube for nitrogen gas, a heating mantle and a 70 cm. long air condenser. Nitrogen gas was then passed over the liquid with heating until the liquid boiled. After 2 minutes of boiling, 5 ml of 770 g/l potassium iodide solution was added and a sample containing approximately 2 meq of active oxygen was added to the reaction mixture with mixing. The air condenser was then connected and the contents of the flask were heated rapidly to boiling and maintained at moderate boiling for 30 minutes. 50 ml of water was then added through the condenser and the condenser was removed from the flask. The reaction mixture was then immediately titrated with a 0.1 N sodium thiosulphate solution until the yellow color disappeared. A blank should be run alongside this titration.

The total active oxygen may then by calculated by subtracting the volume of sodium thiosulphate solution used in the blank from the amount used in the titration, multiplying this figure by the normality of the sodium thiosulphate solution and then by 800, and finally dividing by the mass of the peroxide sample in milligrams.

The active oxygen content of the non-cyclic peroxides used was measured by placing 20 ml of glacial acetic acid in a 200 ml round-bottomed flask fitted with a ground glass joint and an inlet tube for nitrogen gas. Nitrogen gas was then passed over the surface of the liquid. After 2 minutes, 4 ml of 770 g/l potassium iodide solution was added and a sample containing approximately 1.5 meq of active oxygen was added to the reaction mixture with mixing. The reaction mixture was allowed to stand for at least 1 minute at 25° C. ±5° C. The reaction mixture was then titrated with a 0.1 N sodium thiosulphate solution to colorless end point adding 3 ml of 5 g/l starch solution towards the end of the titration. A blank should be run alongside this titration.

Yellowing Index (YI) was measured on a 1.0 mm pressed sheet made using a Fontijn® press. Color was measured against a calibrated (Dr. Lange®) background (X=79.6, Y=84.1, Z=90.7) using a Dr. Lange® microcolor LMC calorimeter according to ASTM 1925.

Grafted polybutadiene:

Free polybutadiene was determined by turbidimetric titration. Three high impact polystyrene (HIPS) solutions were prepared:

1) 60 ml of approx. 0.1% HIPS in stabilized toluene. Final concentration being Cbl (% m/m)

2) 30 ml of approx. 0.3% HIPS in stabilized toluene. Final concentration being Cs (% m/m)

3) To approx. 30 ml of solution 1, approx. 0.01% polybutadiene was added. Additional amount of polybutadiene being Cpb (% m/m)

Before analyzing the sample solutions, they were gently shaken for at least 24 hours to assure complete dissolution of the polymers.

20 ml of a sample solution was titrated with a 9:1 m/m acetone/methanol mixture in a thermostatted vessel (25° C.) equipped with a magnetic stirrer and a colorimetric detector (calibrated fibre optic immersion measuring cell Brinkman PC 600, 420 nm). During titration the change in transmission at 420 nm is recorded. The change in transmission from the beginning of the non-solvent addition until the point where a stable reading is observed is measured. This change in transmission observed for solution 1, 2 and 3 is denoted Tbl, Ts and Tpb respectively.

Free polybutadiene (% m/m) is then calculated as follows:

Cpb/(Cs−Cbl)×(Ts−Tbl)/(Tpb−Tbl)×100

Grafted polybutadiene (% m/m)=100−free polybutadiene

Styrene conversion:

Residual styrene was determined by GC on a solution of the polymer in dichloromethane using n-butylbenzene or t-butylbenzene as an internal standard.

Determination of the dimer/trimer (D/T) ratio by GC-analysis:

Equipment: Hewlett Packard 5890

Column: CP Sil 19CB

Diameter: 0.32 µm

Thickness: 0.20 µm

Length: 25 m

Detector: FID

Tinj: 100° C.

Tdet: 300° C.

Range: 4

Attenuation: 1

Temperature program: 40° C. (2 min.), 8° C./min. to 280° C. (10 min.)

In the following examples, all amounts are given in parts per hundred, based on the amount of (co)polymer employed, unless otherwise specified.

Synthesis Examples

Preparation of MEKP-T3 in Isododecane

To a stirred mixture of 21.6 g of methylethyl ketone, 22.5 g isododecane and 5.9 g of a 50% aqueous solution of sulfuric acid, was added at 20° C., 23.3 g of a 70% aqueous solution of hydrogen peroxide over a period of 60 minutes. After a postreaction time of 60 minutes at 20° C., the organic layer was separated, neutralized with 3.0 g of a 6% aqueous solution of sodium bicarbonate, dried with 1.3 g of magnesium sulfate dehydrate and filtered. The dried organic layer was then diluted with 7.2 g of isododecane to provide 55.2 g of MEKP-T3. The MEKP-T3 had a total active oxygen content of 11.49% with 3.6% of the total active oxygen being attributable to cyclic ketone peroxides of the formulae I–III.

Preparation of MEKP-Cyclic in Isododecane

To a stirred mixture of 28.8 g of methylethyl ketone, 13.5 g isododecane and 14.0 g of a 70% aqueous solution of sulfuric acid, was added at 40° C., 19.4 g of a 70% aqueous solution of hydrogen peroxide over a period of 15 minutes. After a postreaction time of 270 minutes at 40° C., the organic layer was separated, neutralized with 12.5 g of a 6% aqueous solution of sodium bicarbonate, dried with 1.0 g of magnesium sulfate dehydrate and filtered. The dried organic layer was 42.1 g of MEKP-Cyclic. The MEKP-Cyclic had a total active oxygen content of 10.63% with 96.9% of the total active oxygen being attributable to cyclic ketone peroxides of the formulae I–III.

Preparation of MIPKP-Cyclic in Isododecane

To a stirred mixture of 17.2 g of methylisopropyl ketone, 4.0 g isododecane and 19.6 g of a 50% aqueous solution of sulfuric acid, was added at 40° C., 9.7 g of a 70% aqueous solution of hydrogen peroxide over a period of 10 minutes. After a postreaction time of 355 minutes at 40° C., the organic layer was separated and 10.0 g of water was added. This mixture was then neutralized with 5.5 g of an aqueous solution of 4N sodium hydroxide and the neutralized organic layer was evaporated in vacuo at 20 mbar and 20° C. The residue was dried with 0.5 g of magnesium sulfate dehydrate and filtered. The dried organic layer was 12.0 g of MIPKP-Cyclic. The MIPKP-Cyclic had a total active oxygen content of 7.86% with 94.5% of the total active oxygen being attributable to cyclic ketone peroxides of the formulae I–III.

Preparation of MIBKP-Cyclic in Isododecane

To a stirred mixture of 20.0 g of methylisobutyl ketone, 3.0 g isododecane and 19.6 g of a 50% aqueous solution of sulfuric acid, was added at 20° C., 9.7 g of a 70% aqueous solution of hydrogen peroxide over a period of 15 minutes. After a postreaction time of 300 minutes at 20° C., the temperature was increased to 25° C. for an additional postreaction time of 1080 minutes followed by a temperature increase to 30° C. for a postreaction time of 120 minutes and a temperature increase to 40° C. and a postreaction time of 240 minutes.

Thereafter, the organic layer was separated, neutralized with 15.0 g of an aqueous solution of 4N sodium hydroxide and stirred for 120 minutes at 40° C. The neutralized organic layer was separated and washed twice with water. The mixture was evaporated in vacuo at 20 mbar and 20° C. The residue still contained two layers. The clear organic layer was decanted, dried with 0.3 g of magnesium sulfate dehydrate and filtered. The dried organic layer was 11.6 g of MIBKP-Cyclic. The MIBKP-Cyclic had a total active oxygen content of 8.03% with 93.9% of the total active oxygen being attributable to cyclic ketone peroxides of the formulae I–III.

Trigonox® 233 was analyzed and found to contain 8.04% total active oxygen with 1.2% being attributable to cyclic ketone peroxides.

Preparation of MEKP-cyclic in Primol® 352

To a stirred mixture of 28.8 9 methylethyl ketone, 13.5 g Primol 352, and 14.0 g sulfuric acid (70%), 19.4 g of hydrogen peroxide (70%) was added in 20 minutes at 40° C. After a postreaction of 120 minutes at this temperature the organic layer was separated. The organic layer was treated with 10.0 g of a solution of sodium hydrogencarbonate (6%) under stirring for 10 minutes at 20° C. The neutralized organic layer was dried with 1.0 g magnesium sulfate dehydrate and filtrated. The dried organic layer was diluted with 26.4 g Primol 352 resulting in a composition with a weight of 68.3 g.

Preparation of MEKP-cyclic-dimer in Primol® 352

To a stirred mixture of 720 g acetic acid 99%, 97.1 g $H_2O_2$ 70%, 35.2 g water and 7.7 g sulfuric acid 50% was added at 35–39° C. 144.2 g of methyl ethyl ketone in 25 minutes. After a postreaction of 23 hours at 40° C., the reaction mixture was poured into a stirred mixture of 3 liter of water and 40 g Primol 352. The organic layer was separated after 12 hours and treated 3 times with 50 ml sodium hydroxide 4 N for 30 minutes at 30–40° C. The organic layer was separated and washed 2 times with 50 ml saturated sodium chloride solution at 20° C. The organic layer was dried with magnesium sulfate dehydrate and filtrated. The dried organic layer weighed 70.0 g.

Preparation of MEKP-cyclic-trimer in Primol® 352

To a stirred mixture of 86.5 g methyl ethyl ketone and 66.6 g hydrochloric acid 36% was added at 0–2° C. 72.6 g of hydrogen peroxide 30% in 20 minutes, followed by a postreaction of 180 minutes at this temperature. Thereafter 200 ml water and 60.0 g Primol 352 were added. The organic layer was separated and treated 3 times with 50 ml sodium hydroxide 4 N for 30 minutes at 30–40° C. The organic layer was separated and washed 2 times with 50 ml saturated sodium chloride solution at 20° C. The organic layer was dried with magnesium sulfate dehydrate and filtrated. The dried organic layer was diluted with 21.9 g Primol 352 and evaporated at 2 mbar and 40° C., weight 114.4 g.

Preparation of MEKP-cyclic-dimer in Pentadecane

To a stirred mixture of 720 g acetic acid 99%, 97.1 g $H_2O_2$ 70%, 35.2 g water and 7.7 g sulfuric acid 50% was added at 25–37° C. 144.2 g of methylethyl ketone in 30 minutes. After postreactions of 4 hours at 40° C., 12 hours at 20° C. and 7 hours at 40° C., the reaction mixture was poured into a stirred mixture of 3 liter of water and 40 g pentadecane. The organic layer was separated, and treated 2 times with 50 ml sodium hydroxide 4 N for 30 minutes at 30° C. The organic layer was separated and washed 2 times with 50 ml saturated sodium chloride solution at 20° C. The organic layer was dried with magnesium sulfate dehydrate and filtrated. The dried organic layer weighed 79.0 g.

Preparation of MEKP-cyclic-trimer in Pentadecane

To a stirred mixture of 144.2 g methylethyl ketone and 92.0 g hydrochloric acid 36% was added at 0–2° C. 120.1 g of hydrogen peroxide 30% in 30 minutes followed by a postreaction of 180 minutes at this temperature. Thereafter 200 ml water and 80.0 g pentadecane were added. The organic layer was separated and treated 3 times with 50 ml sodium hydroxide 4 N for 30 minutes at 30–40° C. The organic layer was separated and washed 2 times with 50 ml saturated sodium chloride solution at 20° C. The organic layer was dried with magnesium sulfate dehydrate and filtrated. The dried organic layer weighed 168.0 g.

Preparation of MPKP-cyclic in Isododecane

To a stirred mixture of 44.4 g methylpropyl ketone, 20.0 g isododecane and 24.5 g sulfuric acid 50% was added at 40° C. 24.3 g of hydrogen peroxide 70% in 15 minutes, followed by a postreaction of 360 minutes at this temperature. Thereafter the organic layer was separated and treated 3 times 50 ml sodium hydroxide 4 N for 30 minutes at 40° C. The organic layer was separated and washed 2 times with 20 ml saturated sodium chloride solution at 20° C. The organic layer was dried with magnesium sulfate dehydrate, filtrated and the filter was washed with 20.0 g isododecane and added to the organic layer. The dried organic layer was diluted with 85.4 g isododecane resulting in a composition with a weight of 132.7 g.

Preparation of MPKP-cyclic-trimer in Primol® 352

To a stirred mixture of 106.5 g methylpropyl ketone and 72.6 g hydrochloric acid 36% was added at 0–2° C. 72.6 g of hydrogen peroxide 30% in 20 minutes, followed by a postreaction of 180 minutes at this temperature. Thereafter 200 ml water and 50.0 g Primol 352 were added. The organic layer was separated and treated 3 times with 50 ml sodium hydroxide 4 N for 30 minutes at 30–40° C. The organic layer was separated and washed 2 times with 50 ml saturated sodium chloride solution at 20° C. The organic layer was dried with magnesium sulfate dehydrate and filtrated. The dried organic layer was evaporated in vacuo at 2 mbar and 50° C. leaving a composition with a weight of 85.7 g.

Preparation of MPKP-cyclic-dimer in Primol® 352

To a stirred mixture of 720 g acetic acid 99%, 97.1 g $H_2O_2$ 70%, 35.2 g water and 7.7 g sulfuric acid 50% was added at 35–39° C. of 177.5 g methyl propyl ketone in 25 minutes. After a postreaction of 23 hours at 40° C., the reaction mixture was poured into a stirred mixture of 3 liter of water and 30 g Primol 352. The organic layer was separated after 12 hours and treated 3 times with 50 ml sodium hydroxide 4 N for 30 minutes at 30–40° C. The organic layer was separated and washed 2 times with 50 ml saturated sodium chloride solution at 20° C. The organic layer was dried with magnesium sulfate dehydrate and filtrated. The dried organic layer was evaporated in vacuo at 2 mbar and 50° C. leaving a composition with a weight of 130.0 g.

Preparation of MPKP-T4/T3 in Isododecane

To a stirred mixture of 105.0 g methylpropyl ketone, 85 g isododecane and 24.0 g sulfuric acid 50% was added at 20° C. 118.5 of hydrogen peroxide 70% in 30 minutes. After a postreaction of 120 minutes at this temperature the organic layer was separated. To the organic layer was added 25.0 g solution of sodium bicarbonate 6%. The reaction mixture was stirred for an additional 15 minutes at this temperature. The obtained organic layer was dried with 25 g magnesium sulfate dehydrate and filtrated. The dried organic layer, weight 199 g. To 112 g of the obtained solution was added 36.8 g isododecane to give a composition with a weight of 148.8 g.

Preparation of MPKP-T3 in Isododecane

To a stirred mixture of 105.0 g methylpropyl ketone, 85 g isododecane and 24.0 g sulfuric acid 50% was added at 20° C. 118.5 g of hydrogen peroxide 70% in 30 minutes. After a postreaction of 120 minutes at this temperature the organic layer was separated. To the organic layer was added 25.0 g solution of sodium bicarbonate 6%. The organic layer was separated. To 97.0 g of the organic layer was dosed 100 g solution of sodium sulfite 20% in 30 minutes at 20° C. The reaction mixture was stirred for an additional 30 minutes at this temperature. The obtained organic layer was washed with 100 ml of water and dried with 10 g magnesium sulfate dehydrate and filtrated. The dried organic layer weighted 76.0 g. To 75.0 g of the obtained solution was added 10.7 g isododecane to give a composition with a weight of 85.7 g.

Preparation of MIPKP-T3 in Solvesso® 100

To a stirred mixture of 126.6 g methylisopropyl ketone, 150 g hexane and 28.2 g sulfuric acid 50% is added at 20° C. 112.2 of hydrogen peroxide 70% in 30 minutes. After a postreaction of 90 minutes at this temperature the organic layer is separated. To the organic layer is added 30.0 g solution of sodium bicarbonate 6% followed by the dosing of 100 g solution of sodium sulfite 20% in 30 minutes at 20° C. The reaction mixture is stirred for an additional 30 minutes at this temperature. The obtained organic layer is washed with 100 ml of water and dried with 15 g magnesium sulfate dehydrate and filtrated. The dried organic layer weighted 281 g. To 150 g of the obtained solution is added 70 g Solvesso 100. The mixture is evaporated in a rotavapor at 20° C. and 10 mbar. The residue had a weight of 136 g.

Preparation of MBKP-cyclic in Isododecane

To a stirred mixture of 40.0 g methylbutyl ketone, 160 g acetic acid 99% and 1.7 g sulfuric acid 50% was added below 30° C. 21.8 g of hydrogen peroxide 70% in 15 minutes. After a postreaction of 480 minutes at 40° C., the reaction mixture was poured in 600 ml water. To the obtained mixture was added 25.0 9 isododecane under stirring. Thereafter the organic layer was separated. The organic layer was treated 2 times with 50 ml sodium hydroxide 4 N for 30 minutes and thereafter 2 times with 50 ml of water. The organic layer was separated and diluted with 37.5 g isododecane, resulting in a composition with a weight of 80.0 g.

Preparation of MBKP-T4/T3 in Isododecane

To a stirred mixture of 122.0 g methylbutyl ketone, 85 g isododecane and 48.0 g sulfuric acid 50% was added at 30° C. 118.5 of hydrogen peroxide 70% in 30 minutes, subsequently the reaction mixture was cooled to 20° C. in 15 minutes. After a postreaction of 120 minutes at this temperature the organic layer was separated. To the organic layer was added 25.0 g solution of sodium bicarbonate 6%. The reaction mixture was stirred for an additional 15 minutes at this temperature. After separation the obtained organic layer was dried with 25 g magnesium sulfate dehydrate and filtrated. The dried organic layer weight 218 g. To 110 g of the obtained solution was added 37.9 g isododecane to give a composition with a weight of 147.9 g.

Preparation of MBKP-T3 in Isododecane

To a stirred mixture of 122.0 g methylbutyl ketone, 85 g isododecane and 48.0 g sulfuric acid 50% was added at 20° C. 118.5 g of hydrogen peroxide 70% in 30 minutes. After a postreaction of 120 minutes at this temperature the organic layer was separated. To the organic layer was added 25.0 g solution of sodium bicarbonate 6%. The organic layer was separated. To 100.0 g of the organic layer was dosed 100 g solution of sodium sulfite 20% in 30 minutes at 20° C. The reaction mixture was stirred for an additional 30 minutes at this temperature. The obtained organic layer was washed with 100 ml of water and dried with 10 g magnesium sulfate dehydrate and filtrated. The dried organic layer, weight 90.5 g. To 90.0 g of the obtained solution was added 11.3 g isododecane to give a composition with a weight of 101.3 g.

Preparation of DEKP-cyclic in Isododecane

To a stirred mixture of 43.9 g diethyl ketone, 20.0 9 isododecane and 24.5 g sulfuric acid 50% was added at 40° C. 24.3 g of hydrogen peroxide 70% in 15 minutes, followed by a postreaction of 360 minutes at this temperature. Thereafter the organic layer was separated. The organic layer was treated 3 times 50 ml sodium hydroxide 4 N for 30 minutes. minutes at 40° C. The organic layer was separated and washed 2 times with 20 ml saturated sodium chloride solution at 20° C. The organic layer was dried with magnesium sulfate dehydrate, filtrated and the filter was washed with 5.0 g isododecane and added to the organic layer. The dried organic layer was diluted with 57.0 g isododecane, resulting in a composition with a weight of 119.1 g.

Preparation of DEKP-T4/T3 in Isododecane

To a stirred mixture of 122.0 g diethyl ketone, 85 g isododecane and 48.0 g sulfuric acid 50% was added at 30° C. 118.5 of hydrogen peroxide 70% in 60 minutes. After a postreaction of 120 minutes at this temperature the organic layer was separated. To the organic layer was added 25.0 g solution of sodium bicarbonate 6%. The reaction mixture was stirred for an additional 15 minutes at this temperature. After separation the obtained organic layer was dried with 25 g magnesium sulfate dehydrate and filtrated. The dried organic layer, weight 191 g. To 102 g of the obtained solution was added 28.8 g isododecane to give a composition with a weight of 130.8 g.

Preparation of DEKP-T3 in Isododecane

To a stirred mixture of 122.0 g diethyl ketone, 85 g isododecane and 48.0 g sulfuric acid 50% was added at 20° C. 118.5 g of hydrogen peroxide 70% in 30 minutes. After a postreaction of 120 minutes at this temperature the organic layer was separated. To the organic layer 25.0 g solution of sodium bicarbonate 6% was added. The organic layer was separated. To 100.0 g of the organic layer was dosed 100 g solution of sodium sulfite 20% in 30 minutes at 20° C. The reaction mixture was stirred for an additional 30 minutes at this temperature. The obtained organic layer was washed with 100 ml of water and dried with 10 g magnesium sulfate dihydrate and filtrated. The dried organic layer weight 87.0 g. To 86.0 g of the obtained solution was added 14.1 g isododecane to give a composition with a weight of 101.1 g.

Analysis of the prepared ketone peroxides

| Ketone | Tot % AO | % AO cycl. ket. perox. | D/T GC | % AO linear ket. perox.* |
|---|---|---|---|---|
| MEKP-T3[1] | 11.49 | 0.41 | n.d. | 11.08 |
| MEKP-cyclic[1] | 10.63 | 10.30 | n.d. | 0.33 |
| MEKP-cyclic[2] | 10.92 | 10.59 | n.d. | 0.33 |
| MEKP-cyclic-D[2] | 6.58 | n.d. | 98/2 | n.d |
| MEKP-cyclic-T[2] | 7.06 | n.d. | 2/98 | n.d. |
| MEKP-cyclic-D[3] | 8.56 | n.d. | 98/2 | n.d. |
| MEKP-cyclic-T[3] | 10.11 | n.d. | 2/98 | n.d. |
| MPKP-cyclic[1] | 2.15 | n.d. | 14/86 | n.d. |
| MPKP-cyclic-T[2] | 7.12 | n.d. | 3/97 | n.d. |
| MPKP-cyclic-D[2] | 6.18 | n.d. | 99/1 | n.d. |
| MPKP-T4/T3[1] | 9.0 | 0.07 | n.d. | 8.93 |
| MPKP-T3[1] | 9.0 | 0.27 | n.d. | 8.73 |
| MIPKP-cyclic[1] | 7.86 | 7.42 | n.d. | 0.44 |
| MIPKP-T3[4] | n.d | n.d | n.d. | 8.24 |
| MBKP-cyclic[1] | 2.4 | n.d | 4/96 | n.d. |
| MBKP-T4/T3[1] | 9.0 | 0.63 | n.d. | 8.37 |
| MBKP-T3[1] | 9.0 | 0.42 | n.d. | 8.58 |
| MIBKP-cyclic[1] | 8.03 | 7.54 | n.d. | 0.49 |
| DEKP-cyclic[1] | 2.09 | n.d. | 31/69 | n.d. |
| DEKP-T4/T3[1] | 9.0 | 0.16 | n.d. | 8.84 |
| DEKP-T3[1] | 9.0 | 0.11 | n.d. | 8.89 |

[1]Isododecane
[2]Primol ® 352
[3]Pentadecane
[4]Solvesso ® 100
*Including hydrogen peroxide

EXAMPLES 1–7 AND COMPARATIVE EXAMPLES A–I

In these examples, Moplen® FLS20 was premixed with 0.1 weight percent of Irganox® 1010 antioxidant and the amounts of the peroxides mentioned in Table 1 to give an active oxygen concentration of 0.011%. The peroxides were all diluted in isododecane as phlegmatizer. The mixing was performed in a cubic mixer for a period of 15 minutes.

The polypropylene degradation reaction was then carried out in a Haake-Rheocord® System 40 fitted with a twin-screw extruder (Rheomex® TW100 containing intensive mixing screws) at 250° C. and 60 r.p.m. under a nitrogen flush. Example 1 was repeated under an air atmosphere without nitrogen flush and the MFI for the air atmosphere modification is given in parenthesis in Table 1. The degraded polypropylene was granulated and dried at 60° C. before further evaluation for yellowing index. The results are given in Table 1.

TABLE 1

| Example | Peroxide | Amount of peroxide (g/100 g Polymer) | MFI (g/10 min) | Yellowing index |
|---|---|---|---|---|
| A | None | — | 2.3 | 4.7 |
| B | Trigonox ® 101 | 0.105 | 62 | 5.9 |
| 1 | MEKP-cyclic | 0.107 | 78(87*) | 5.6 |
| 2 | MEKP-cyclic-T | 0.551 | 78 | 6.1 |

TABLE 1-continued

| Example | Peroxide | Amount of peroxide (g/100 g Polymer) | MFI (g/10 min) | Yellowing index |
|---|---|---|---|---|
| C | Butanox ® LPT | 0.130 | 9.4 | 7.8 |
| 3 | MIPKP-cyclic | 0.149 | 38 | 5.0 |
| 4 | MIBKP-cyclic | 0.146 | 60 | 5.6 |
| D | Trigonox ® 233 | 0.137 | 9.6 | 8.1 |
| 5 | DEKP-cyclic | 0.527 | 48 | 6.1 |
| E | DEKP T3 + T4 | 0.122 | 6.9 | 7.6 |
| F | DEKP T3 | 0.122 | 7.5 | 7.6 |
| 6 | MPKP-cyclic | 0.513 | 72 | 6.4 |
| G | MPKP T3 + T4 | 0.122 | 8.6 | 7.7 |
| 7 | MBKP-cyclic | 0.459 | 76 | 6.0 |
| H | MBKP T3 + T2 | 0.122 | 9.6 | 7.1 |
| I | MBKP T3 | 0.122 | 8.7 | 7.6 |

Concentration: 0.11% active oxygen
*extruded in an air atmosphere without a nitrogen flush.

From Table 1 it can be seen that the cyclic ketone peroxides of the present invention give a much higher degree of polypropylene degradation than their non-cyclic ketone peroxide counterparts. In fact, the present cyclic ketone peroxides are shown to be comparable to the commercial product, Trigonox® 101, which is currently employed in polypropylene degradation. Finally, degradation with cyclic ketone peroxides resulted in less yellowing than comparable processes employing their non-cyclic ketone peroxide counterparts.

EXAMPLES 8–35 AND COMPARATIVE EXAMPLES J–V

The procedure of Example I was repeated except that MEKP-cyclic, DEKP-cyclic, MPKP-cyclic, and MBKP-cyclic, were employed in varying concentrations as given in Table 2. Comparative examples employed no peroxide and the linear ketone peroxides Butanox® LPT, MPKP, DEKP and MBPK, respectively. The results are given in Table 2.

TABLE 2

Effect of concentration of ketone peroxides

| Example | Peroxide | Amount of peroxide (g/100 g polymer) | Total Active Oxygen in polymer (%) | MFI (g/10 min) |
|---|---|---|---|---|
| 7 | MEKP-cyclic[1] | 0 | 0 | 2.3 |
| 8 | | 0.044 | 0.005 | 26 |
| 9 | | 0.088 | 0.009 | 54 |
| 10 | | 0.132 | 0.014 | 98 |
| 11 | | 0.176 | 0.019 | 153 |
| 12 | MEK-cyclic[1]* | 0.269 | 0.006 | 38 |
| 13 | | 0.538 | 0.011 | 70 |
| 14 | | 0.807 | 0.017 | 122 |
| 15 | MEKP-cyclic-D[2] | 0.084 | 0.006 | 44 |
| 16 | | 0.168 | 0.011 | 90 |
| 17 | | 0.252 | 0.017 | 142 |
| 18 | MEKP-cyclic-T[2] | 0.078 | 0.006 | 30 |
| 19 | | 0.156 | 0.001 | 69 |
| 20 | | 0.234 | 0.017 | 110 |
| 21 | MPKP-cyclic[1] | 0.257 | 0.006 | 30 |
| 22 | | 0.513 | 0.011 | 78 |
| 23 | | 0.770 | 0.017 | 139 |
| 24 | MPKP-cyclic-D[2] | 0.089 | 0.006 | 39 |
| 25 | | 0.178 | 0.011 | 107 |
| 26 | | 0.276 | 0.017 | 161 |
| 27 | MPKP-cyclic-T[2] | 0.077 | 0.006 | 33 |
| 28 | | 0.155 | 0.011 | 62 |
| 29 | | 0.232 | 0.017 | 88 |
| 30 | DEKP-cyclic[1] | 0.264 | 0.006 | 24 |
| 31 | | 0.527 | 0.011 | 40 |
| 32 | | 0.791 | 0.017 | 71 |
| 33 | MBKP-cyclic[1] | 0.230 | 0.006 | 30 |
| 34 | | 0.459 | 0.011 | 78 |
| 35 | | 0.689 | 0.017 | 139 |
| K | DEKP T3 + T4[1] | 0.061 | 0.006 | 4.6 |
| L | | 0.122 | 0.011 | 6.9 |
| M | | 0.184 | 0.017 | 9.4 |
| N | MPKP T3 + T4[1] | 0.062 | 0.006 | 5.9 |
| O | | 0.122 | 0.011 | 8.6 |
| P | | 0.184 | 0.017 | 11 |
| Q | MBKP T3 + T4[1] | 0.061 | 0.006 | 5.1 |
| R | | 0.122 | 0.011 | 9.6 |
| S | | 0.184 | 0.017 | 12 |
| T | Butanox ® LPT | 0.061 | 0.006 | 7.1 |
| U | | 0.122 | 0.011 | 8.1 |
| V | | 0.184 | 0.017 | 11 |

*diluted to 2.05% active oxygen
[1]Isododecane
[2]Primol ® 352

From Table 2 it can be seen that increasing concentrations of cyclic ketone peroxides result in increasing levels of polypropylene degradation. Accordingly, the desired degree of polymer degradation can be controlled by adjusting the concentration of the cyclic ketone peroxide employed. Linear ketone peroxide counterparts give very low polypropylene degradation, as shown in the comparative examples.

EXAMPLES 36–54 AND COMPARATIVE EXAMPLES W–CC

In these examples, polymer modification was carried out at various temperatures to demonstrate that the invention is applicable at different modification temperatures. The process of Example 1 was repeated except that the polymer modification temperature was varied, and the amount of peroxide was also varied, as shown in Table 3. The results of the modification of polypropylene are also given in Table 3.

TABLE 3

Modification at different temperatures

| Example | Peroxide | Amount of peroxide (g/100 g polymer) | Total Active Oxygen in polymer (%) | Temp ° C. | MFI (g/10 min) |
|---|---|---|---|---|---|
| W | Trigonox ® 233 | 0.235 | 0.019 | 200 | 4.9 |
| X | | 0.235 | 0.019 | 225 | 7.2 |
| Y | MEKP-T3 | 0.236 | 0.023 | 200 | 8.3 |
| Z | | 0.236 | 0.023 | 225 | 12 |
| 36 | MEKP-cyclic[1] | 0.176 | 0.018 | 200 | 91 |
| 37 | | 0.176 | 0.018 | 225 | 112 |
| 38 | | 0.176 | 0.018 | 250 | 153 |
| 39 | | 0.176 | 0.018 | 275 | 175 |
| 40 | MEKP-cyclic[1]* | 0.227 | 0.011 | 200 | 36 |
| 41 | | 0.227 | 0.011 | 225 | 46 |
| 42 | | 0.227 | 0.011 | 250 | 78 |
| 43 | MEKP-cyclic-D[2] | 0.134 | 0.011 | 200 | 31 |
| 44 | | 0.134 | 0.011 | 225 | 40 |
| 45 | | 0.134 | 0.011 | 250 | 59 |
| 46 | MEKP-cyclic-T[2] | 0.156 | 0.011 | 200 | 50 |

TABLE 3-continued

Modification at different temperatures

| Example | Peroxide | Amount of peroxide (g/100 g polymer) | Total Active Oxygen in polymer (%) | Temp °C. | MFI (g/10 min) |
|---|---|---|---|---|---|
| 47 | | 0.156 | 0.011 | 225 | 53 |
| 48 | | 0.156 | 0.011 | 250 | 72 |
| AA | Butanox ® LPT | 0.129 | 0.011 | 200 | 4.7 |
| BB | | 0.129 | 0.011 | 225 | 5.5 |
| CC | | 0.129 | 0.011 | 250 | 8.1 |
| 49 | MPKP-cyclic-D[2] | 0.143 | 0.011 | 200 | 32 |
| 50 | | 0.143 | 0.011 | 225 | 40 |
| 51 | | 0.143 | 0.011 | 250 | 64 |
| 52 | MPKP-cyclic-T[2] | 0.155 | 0.011 | 200 | 44 |
| 53 | | 0.155 | 0.011 | 225 | 50 |
| 54 | | 0.155 | 0.011 | 250 | 68 |

*diluted to 3.9% active oxygen
[1]Isododecane
[2]Primol ® 352

From Table 3 it can be seen that the higher the modification temperature, the greater the degree of polypropylene degradation. This demonstrates that the process of the present invention is effective over a wide temperature range and that the degree of polymer degradation can be controlled, to an extent, by varying the modification temperature. Further, it is shown that the non-cyclic ketone peroxides (MEKP-T3, Butanox® LPT and Trigonox® 233) are far less effective in polypropylene degradation than the cyclic ketone peroxides of the present invention.

EXAMPLES 55–58 AND COMPARATIVE EXAMPLES DD–FF 100 parts of Keltan® 520 elastomer, 50 parts of carbon black and 10 parts of paraffinic oil were mixed over 5 minutes in a 1.6-liter Banbury-mixer with a 70% load factor at 50° C. using a rotor speed of 77 r.p.m. The amount of peroxide and coagent given in Table 4 were then mixed with the elastomer mixture on a two-roll mill according to standard procedures well-known to those skilled in the art.

Rheograms of the elastomer mixture were made and the results that were obtained are given in Table 5.

TABLE 4

Composition of test formulations (weight parts)

| | DD | 55 | EE | 56 | 57 | 58 | FF |
|---|---|---|---|---|---|---|---|
| EPDM Keltan ® 520 | 100 | 100 | 100 | 100 | 100 | 100 | 100 |
| Carbon black N-772 | 50 | 50 | 50 | 50 | 50 | 50 | 50 |
| Par. Oil Sunpar ® 150 | 10 | 10 | 10 | 10 | 10 | 10 | 10 |
| Perkadox ® 14-40MB-GR | 4.2 | — | — | — | — | — | — |
| MEKP-cyclic | — | 1.6 | — | 3.2 | 6.4 | 1.6 | — |
| Trigonox ® 145-45B-PD | — | — | 3.2 | — | — | — | — |
| Perkalink ® 300 | — | — | — | — | — | 1.0 | — |
| MEKP-T3 | — | — | — | — | — | — | 1.5 |

TABLE 5

Rheological results

| | DD | 59 | EE | 60 | 61 | 62 | FF |
|---|---|---|---|---|---|---|---|
| Temperature (° C.) | 180 | 200 | 190 | 200 | 200 | 200 | 200 |
| ts2 (min) | 0.58 | 3.31 | 0.71 | 1.44 | 0.89 | 3.18 | — |
| t90 (min) | 5.97 | 9.66 | 7.82 | 8.86 | 7.53 | 10.32 | — |
| MH (Nm) | 1.92 | 0.56 | 1.87 | 0.98 | 1.40 | 0.65 | — |
| ML (Nm) | 0.14 | 0.11 | 0.13 | 0.12 | 0.10 | 0.11 | — |
| Delta Torque (Nm) | 1.78 | 0.45 | 1.74 | 0.86 | 1.30 | 0.54 | — | ts2: time for "safe processing"; start of scorch
t90: time needed for 90% of the total cure
MH: highest torque
ML: lowest torque
Delta torque: (MH-ML), indication of crosslink density
— means no crosslinking occurred These examples show that, at equivalent active oxygen concentrations, the cyclic ketone peroxides of the present invention increase the scorch time (ts2) as compared to the control and to other commercially available peroxides used in EPDM crosslinking thereby leading to a greater degree of process safety. Further, the non-cyclic methylethyl ketone peroxide (MEKP-T3) gave no crosslinking whatsoever.

EXAMPLES 63–64 AND COMPARATIVE EXAMPLE GG

The procedure of Examples 55–58 was repeated except that the vulcanization temperature and the type and amount of peroxide were varied as is given in Table 6. The amount of each peroxide was chosen such that all examples employed the same concentration of active oxygen. The results are also given in Table 6.

TABLE 6

Composition of test formulations (wt. parts) and rheological results

| | DD | 63 | 64 | GG |
|---|---|---|---|---|
| EPDM Keltan ® 520 | 100 | 100 | 100 | 100 |
| Carbon Black N-772 | 50 | 50 | 50 | 50 |
| Paraffinic Oil Sunpar ® 150 | 10 | 10 | 10 | 10 |
| Perkadox ® 14-40MB-GR | 4.2 | — | — | — |
| MIPKP-cyclic | — | 1.9 | — | — |
| MIBKP-cyclic | — | — | 1.7 | — |
| Trigonox ® 233 | — | — | — | 2.1 |
| Temperature (° C.) | 180 | 200 | 200 | 200 |
| ts2 (min) | 0.58 | 2.35 | 1.80 | — |
| t90 (min) | 5.97 | 5.23 | 6.17 | — |
| MH (Nm) | 1.92 | 0.40 | 0.58 | — |
| ML (Nm) | 0.14 | 0.13 | 0.13 | — |
| Delta Torque (Nm) | 1.78 | 0.27 | 0.46 | — |

These examples demonstrate that the non-cyclic ketone peroxide MEKP-T3 and the peroxide Trigonox® 233 do not give cross-linking. The cyclic ketone peroxides of the present invention gave both cross-linking and a greater degree of processing safety as indicated by the increased scorch time (ts2).

EXAMPLES 65–66 AND COMPARATIVE EXAMPLE HH

In these examples, amounts of MEKP-cyclic and Perkadox® 14-40MB-GR were chosen to provide equivalent amounts of active oxygen in the process of Example 12. The delta torque realized by each of compounds were then measured using a Göttfert® Elastograph:

Formulation DD at 250° C. giving a delta torque of 0.98 Nm.

Formulation 59 at 200° C. giving a delta torque of 0.34 Nm.

Formulation 59 at 250° C. giving a delta torque of 0.44 Nm.

These examples show that the cyclic ketone peroxides of the present invention are more active in EPDM crosslinking at higher temperatures.

EXAMPLES 67–69 and Comparative Example II

A solution of 6 wt % polybutadiene in styrene was prepared by slowly adding the correct amount of polybutadiene crumbs to styrene under stirring. The bottle was stirred in the dark for 24 hrs to allow complete dissolution of the polybutadiene.

A 1 liter stainless steel Buchi reactor, equiped with a baffle, three bladed impeller, pressure transducer and nitrogen purge was charged with a solution of 0.375 meq initiator in 250 g of the 6 wt % polybutadiene in styrene solution. The reactor was evacuated and pressurized. The reaction was carried out at 5 bar nitrogen pressure at 130° C. Samples were bottom discharged after 2 hrs of polymerization and analysed for grafted polybutadiene and conversion. The results are given in Table 7.

TABLE 7

| | Example | | | |
|---|---|---|---|---|
| | 67 | 68 | 69 | II |
| Initiator | MEKP-cyclic D | MEKP-cyclic T | MIPKP-cyclic D/T | MIPKP-T3 |
| Grafted PB (%) | 71.7 | 69.0 | 70.3 | 59.8 |
| Styrene conversion (%) | 62.7 | 62.6 | 60.0 | 43.8 |

EXAMPLES 70–71 AND COMPARATIVE EXAMPLES JJ–NN

In these examples, a similar procedure was carried out as in Example 1, except that Hostalen® PPH15O was used as the polypropylene. Also stabilizers were added to the mixtures which are commonly used in practice in the controlled degradation of polypropylene: Irganox® B225 (mixture of phenolic type and phosphate type of antioxidant) and Tinuvin® 770 (UV stabilizer). Also Trigonox® 101 was used in comparative examples.

TABLE 8

Polypropylene degradation in the presence of stabilizers (weight parts per 100 parts propylene)

| | Example | | | | | | |
|---|---|---|---|---|---|---|---|
| | JJ | KK | LL | MM | 70 | NN | 71 |
| Trigonox® 101 | — | — | — | 0.1 | — | 0.1 | — |
| MEKP-cyclic[1] [2] | — | — | — | — | 0.538 | — | 0.538 |
| Irganox® B225[3] | — | 0.1 | — | 0.1 | 0.1 | — | — |
| Tinuvin® 770 | — | 0.1 | 0.1 | 0.1 | 0.1 | 0.1 | 0.1 |
| Ca-stearate | — | 0.1 | — | 0.1 | 0.1 | — | — |
| MFI (230° C./2.16 kg) | 0.4 | 0.3 | 0.4 | 18 | 21 | 22 | 22 |

TABLE 8-continued

Polypropylene degradation in the presence of stabilizers (weight parts per 100 parts propylene)

| | Example | | | | | | |
|---|---|---|---|---|---|---|---|
| | JJ | KK | LL | MM | 70 | NN | 71 |
| YI after UV treatment | | | | | | | |
| 0 hr | 5.7 | 5.3 | 5.0 | 4.9 | 5.0 | 4.8 | 4.9 |
| 100 hr | 9.2 | 8.6 | 8.0 | 8.0 | 7.8 | 7.5 | 7.6 |

[1]isododecane
[2]diluted to 2.05% active oxygen
[3]Irganox® B225: Irganox® 1010/Irgafos® 168 1:1

From this table it can be seen that the application of MEKP-cyclic results in substantial polypropylene degradation in the presence of the stabilizers. No negative effect on UV discoloration was observed. Results of MFI and YI obtained with MEKP-cyclic were comparable with those obtained with Trigonoxc® 101.

EXAMPLE 72–73 AND COMPARATIVE EXAMPLES OO–RR

In these examples, homopolymer (Hostalen® PPR1060F), copolymer (Stamylan® 56MN10) and an elastomer blend (Hostalen® PPN8009) were mixed and reacted with 0.011% active oxygen of MEKP-cyclic and 0.1 wt % Irganox 1010 antioxidant. The polypropylene degradation reaction was carried out in a Haake-Rheocord® System 90 fitted with a mixing chamber (Rheomix RM600, containing roller rotors) at 200° C. or 225° C. for 10 minutes. The degraded polypropylene was granulated before evaluation of MFI.

TABLE 9

Modification of homopolymer, copolymer and an elastomer blend (compositions in weight parts)

| | Example | | | | | |
|---|---|---|---|---|---|---|
| | OO | 72 | PP | QQ | 73 | RR |
| Hostalen® PPR1060F | 100 | 100 | 100 | — | — | — |
| Stamylan® 56MN10 | — | — | — | — | — | — |
| Hostalen® PPN8009 | — | — | — | 100 | 100 | 100 |
| MEKP-cyclic-T[2] | — | 0.156 | — | — | 0.156 | — |
| Butanox® LPT100 | — | — | 0.129 | — | — | 0.129 |
| MFI (200° C.) g/10 min | 3.5 | 21 | 5.4 | 2.9 | 5.5 | 3.9 |

| | Example | | |
|---|---|---|---|
| | SS | 74 | TT |
| Hostalen® PPR1060F | — | — | — |
| Stamylan® 56MN10 | 100 | 100 | 100 |
| Hostalen® PPN8009 | — | — | — |
| MEKP-cyclic-T[2] | — | 0.156 | — |
| Butanox® LPT | — | — | 0.129 |
| MFI (225° C.) g/10 min | 14 | 34 | 17 |

[2]Primol® 352

From this Table 9 it can be seen that the application of MEKP-cyclic results in degradation of coplymers to a much higher degree than the non-cyclic ketone peroxide counterpart.

EXAMPLES 74–77 AND COMPARATIVE EXAMPLES SS–VV

In these examples LLDPE (Escorene® LL1001XV) was mixed and reacted with different concentrations of peroxide according to the procedure of Examples 70–71. The LLDPE modification reaction was carried out at 225° C. for 10 minutes. The modified LLDPE was granulated before evaluation of melt strength. The results are shown in Table 10.

TABLE 10

Modification of LLDPE

| Example | Peroxide | Amount of peroxide (g/100 g polymer) | Total Act. Oxygen in polymer (%) | Melt strength (cN) |
|---|---|---|---|---|
| SS | none | 0 | 0 | 2.9 |
| 74 | MEKP-cyclic[2] | 0.0078 | 0.0006 | 3.1 |
| 75 | | 0.0156 | 0.0011 | 3.7 |
| 76 | | 0.0311 | 0.0022 | 4.5 |
| 77 | | 0.1244 | 0.0088 | 4.2 |
| TT | Butanox ® LPT | 0.0064 | 0.0006 | 2.7 |
| UU | | 0.0129 | 0.0011 | 2.8 |
| VV | | 0.1028 | 0.0088 | 3.4 |

[2]Primol ® 352

Table 10 shows that after the reaction of LLDPE with MEKP-cyclic its melt strength was improved to a higher degree than when using linear ketone peroxide counterpart.

The foregoing examples were presented for the purpose of illustration and description only and are not to be contrued as limiting the invention in any way. The scope of the invention is to be determined from the claims appended hereto.

What is claimed is:

1. A process for the modification of (co) polymers employing an organic peroxide comprising the step of contacting a (co) polymer with organic peroxide under conditions whereby at least some of said organic peroxide is decomposed, wherein at least 20% of the total active oxygen content of the organic peroxide is attributable to at least one cyclic ketone peroxide selected from peroxides represented by the formulae I–III:

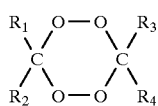
(I)

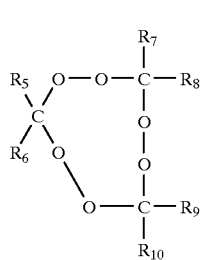
(II)

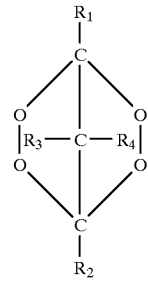
(III)

wherein $R_1$–$R_{10}$ are independently selected from the group consisting of hydrogen, $C_1$–$C_{20}$ alkyl, $C_3$–$C_{20}$ cycloalkyl, $C_6$–$C_{20}$ aryl, $C_7$–$C_{20}$ aralkyl and $C_7$–$C_{20}$ alkaryl, which groups may include linear or branched alkyl moieties; and each of $R_1$–$R_{10}$ may be optionally substituted with one or more groups selected from hydroxy, $C_1$–$C_{20}$ alkoxy, linear or branched $C_1$–$C_{20}$ alkyl, $C_6$–$C_{20}$ aryloxy, halogen, ester, carboxy, nitrile, and amido.

2. The process of claim 1 wherein in the formulae I–III, $R_1$–$R_{10}$ are independently selected from $C_1$–$C_{12}$ alkyl groups.

3. The process of claim 1 wherein said contacting step is carried out at a temperature of 50–350° C. and the total amount of organic peroxide is 0.001–15% by weight, based on the weight of the (co) polymer.

4. The process of claim 3 wherein the contacting step is carried out at a temperature of 100–300° C., the total amount of organic peroxide is 0.01–10% by weight, based on the weight of the (co)polymer and at least 50% of the total active oxygen content employed in the modification process is attributable to one or more cyclic ketone peroxides of the formulae I–III.

5. The process of claim 1 wherein said contacting step is carried out in the further presence of a cogent selected from the group consisting of di- and triallyl compounds, di- and tri(meth)acrylate compounds, bismaleimide compounds, divinyl compounds, polyalkenylbenzenes and oligomers and polymers thereof, vinyl toluene, vinyl pyridine, parachinone dioxime, polybutadiene and derivatives of these compounds.

6. The process of claim 1 wherein said (co) polymer is selected from the group consisting of isotactic polypropylene, atactic polypropylene, syndiotactic polypropylene, alkylene/propylene copolymers, alkylene/propylene/butylene terpolymers, propylene/diene monomer copolymers, propylene/styrene copolymers, poly(butene-1), poly(butene-2), polyisobutene, isoprene/isobutylene copolymers, chlorinated isoprene/isobutylene copolymers, poly(methylpentene), polyvinyl alcohol, polystyrene, poly (α-methyl)stryrene, 2,6-dimethyl polyphenylene oxide and mixtures or blends of these polymers with one another and/or with other non-degradable polymers.

7. The process of claim 1 wherein said (co) polymer is selected from the group consisting of low, linear low, medium and high density polyethylene, ethylene/alkene copolymers, ethylene/propylene/diene monomer terpolymers, chlorosulphonated polyethylene, chlorinated polyethylene, ethylene/vinyl acetate copolymers, ethylene/propylene copolymers, propylene/diene monomer copolymers, brominated isoprene/isobutylene copolymer, partially hydrogenated butadiene/acrylonitrile copolymers, polyisoprene, polychloroprene, poly(cycopentadiene), poly (methylcyclopentadiene), polynorbornene, isoprene/styrene copolymers, butadiene/styrene copolymers, butadiene/ acrylonitrile copolymers, acrylonitrile/butadiene/styrene terpolymers, polyacrylamides, polymethacrylamides, polyurethanes, polysulfides, polyethylene terephthalate, polybutylene terephthalate, copolyether esters, polyamides, silicone rubbers, fluorrubbers, allylglycidylether/ epichlorohydrin copolymers and mixtures or blends thereof.

8. The process of claim 1 wherein said (co) polymer is selected from the group consisting of copolymers and block copolymers of conjugated 1,3-dienes and one or more copolymerizable monoethylenically unsaturated monomers, halogenated aromatic monovinylidene hydrocarbons, (meth) acrylonitrile, alkyl (meth)acrylates, acrylamides, unsaturated ketones, vinyl esters, vinylidenes, vinyl halides, ethylene/propylene copolymers, ethylene/propylene copolymers with other (poly)unsaturated compounds, polyolefins and copolymers thereof, and polyols.

9. The process of claim 1 wherein said organic peroxide comprises a peroxide selected from the group consisting of cyclic methylethyl ketone peroxide, cyclic acetone peroxide, cyclic methyl-n-amyl ketone peroxide, cyclic methylheptyl ketone peroxide, cyclic methylhexyl ketone peroxide and cyclic methylpropyl ketone peroxide.

* * * * *